March 13, 1951 R. H. MORGAN 2,545,040
MULTISPEED MOTOR HEAD UNIT
Filed July 20, 1949
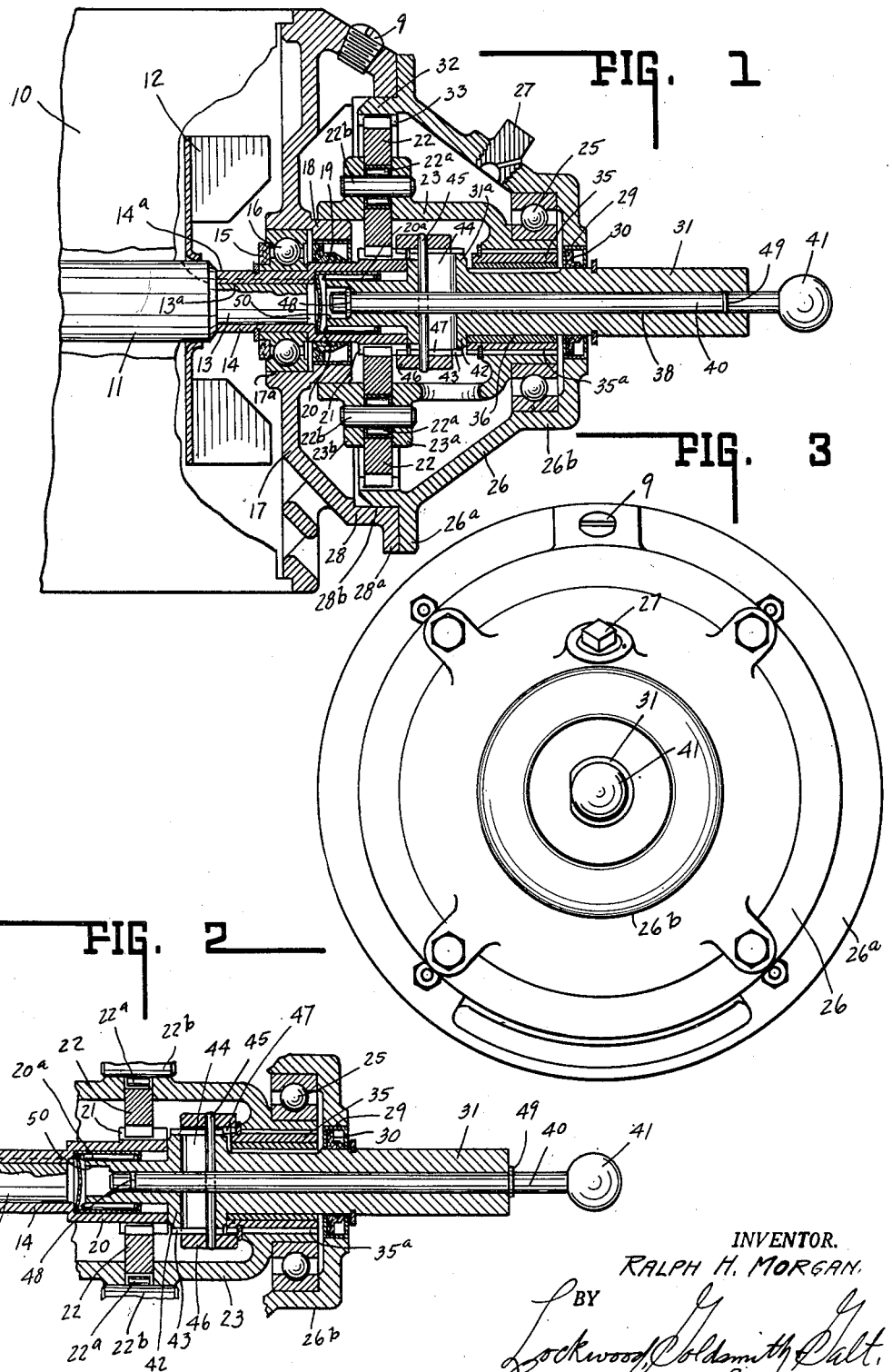
INVENTOR.
RALPH H. MORGAN.
BY
Lockwood, Goldsmith & Galt,
ATTORNEYS.

Patented Mar. 13, 1951

2,545,040

UNITED STATES PATENT OFFICE 2,545,040

MULTISPEED MOTOR HEAD UNIT

Ralph H. Morgan, Indianapolis, Ind., assignor to Charles Drexler Co., Inc., Indianapolis, Ind., a corporation Application July 20, 1949, Serial No. 105,799

4 Claims. (Cl. 74—750)

This invention relates to a uni-directional dual speed drive head structure for a motor. If the motor be of reversible type, obviously the dual speed control is effective in either direction of motor rotation.

The chief object of the present invention is to provide a motor drive control of power take-off type that selectively provides one of two speeds by the mere shifting of control members and without requiring belts, etc., or the usual change speed sets of gears.

The chief feature of the present invention resides in the separation of a motor drive shaft and inclusion in a motor-head of a gear-clutch structure for selective speed connection of the separated shafts (and separation thereof if desired) and by manual means disposed within and projecting outwardly from the exposed and driving end of the shaft.

Other objects and features of the invention will be set forth more fully hereinafter.

The full nature of the invention will be understood from the accompanying drawings and the following description and claims.

In the drawings

Fig. 1 is a longitudinal central sectional view through the multi-part motor shaft and its associated parts and motor end or head, the major portion of the motor being omitted, and such part as is shown being illustrated in elevation, parts being shown in one speed position.

Fig. 2 is a similar view of the critical parts in a second speed position.

Fig. 3 is an end view of the motor end or head.

In Fig. 1, 10 indicates generally the major portion of an electric motor having a rotor shaft 11 and having a ventilating fan 12 press fitted or otherwise secured to it for motor ventilation purposes. The motor shaft is reduced at the end 13, and keyway 13a takes key 14a whereby the shaft end is secured to sleeve shaft portion 14.

A plate-like closure 17 for the motor casing includes bore 17a in which is mounted anti-friction support 16 that rotatably supports the sleeve shaft 14 which projects through said bore. This plate has tubular extension 18 thereon. The sleeve shaft is elongated and is enlarged as at 20 within the extension and beyond the same. Lubricant seal 19 between the two last mentioned portions and seal 15 between the race 16 and said sleeve prevent lubricant escape from the selective drive to the rotor and stator portions of the motor.

Partition plate 17 includes outer tubular extension 28 with flange 28a and a central internal bearing portion 28b. A conical end closure 26 has a complementary anchoring flange 26a and cup-like end 26b with central aperture 29. This cup bearing mounts the anti-friction race 25.

Tubular drive shaft 31 extends through aperture 29 and is lubricant sealed as at 30. A filling plug 9 and vent plug 27 may be included in portions 28 and 26 as illustrated. Tubular member 23 within the chamber formed by said portions at one end peripherally envelopes extension 18 as shown and at its other end it is reduced and supported within said race 25.

The tubular drive shaft 31 extends into tubular member 23 and is enlarged at 31a therein. The enclosed end of the shaft is reduced and is nested within the enlarged sleeve portion 20 and rotatably supported thereby is the roller bearing 20a.

Sleeve 20 includes external gear portion 21. Meshing therewith are pinions 22 which mesh with ring gear 33 upon the tubular portion 32 of casing 26 and nested within tubular portion 28. Note the gear teeth 21 are longitudinally extended.

Pinions 22 are anti-frictionally supported at 22a by pins 22b carried by sleeve 23, the latter being suitably enlarged and slotted as at 23a and 23b respectively. Thus sleeve 23 is rotated in the same direction as sleeve 20 but at a much slower rate. The other end of said sleeve 23 is spline connected to sleeve 35 which includes teeth 35a. Bearing 36 is interposed between the sleeve 35 and shaft 31 as shown.

Shaft 31, as thus described, is free of either sleeve 20, gear teeth 21, or sleeve 35, gear teeth 35a. Disposed in the tubularity 38 of drive shaft 31 is a cylindrical control member 40 terminating in a spherical handle 41.

The exterior of shaft 31 enlargement 42 is toothed as at 43. Extending diametrically through said enlargement is the axially elongated radial bore 44. A pin 45 in said bore secures shifter member 40 to clutch collar 46 having internal teeth 47 sliding longitudinally upon teeth 43.

When the ball is pushed in, see Fig. 1, clutch collar 46 clutches planetary gear 20 to drive shaft 31 and the drive is direct or the ratio is 1 to 1. When the ball is pulled out the clutch collar 46 clutches the sleeve 35 to shaft 31. Hence the drive is indirect and in a different ratio.

The length of slot 44 is such, compared to the width of clutch collar 46, that when the ball 41 is intermediately positioned shaft 31 is not driven by shaft 11. Near each end of shaft 40 is a friction ring 48 and 49. When one is in or compressed, the other is out or released, compare Figs. 1 and 2. The inner end 50 of tubularity 38 of shaft 31 permits of such movement and action.

Thus the control member 41 is singly held in either clutching position and multiple held in neutral position.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In combination with an electric motor having shaft means projecting therefrom, the projecting end thereof being tubular and externally having planetary sun gear teeth thereon, planetary pinions meshing with said sun gear teeth, a sleeve carrier for the pinions, a housing for the sleeve carrier, means within said housing supporting the opposite ends of said sleeve carrier, a ring gear rigid with said housing and with which the pinions mesh, said housing being rigid with the motor, a tubular drive shaft disposed within the housing and projecting therefrom, a longitudinally movable control member projecting beyond the housing exposed end of the drive shaft for selective speed control thereof, the drive shaft having splines thereon axially spaced from the sun gear teeth, toothed clutch means having the teeth thereof slidingly engaging the splines of the drive shaft and shiftable by said control member, into engagement with the sun gear teeth.

2. In combination a rotatable shaft means having externally disposed teeth at one end thereof and forming a sun gun, planetary pinions meshing therewith, a stationary ring gear for said pinions, the sun gear teeth being elongated beyond the pinion, a sleeve type carrier means for said pinions and having teeth thereon, a tubular shaft disposed within one of said means and operatively supported by the other of said means, a clutch member slidable longitudinally upon said shaft and non-rotative relative thereto and adapted for selective engagement with the sun gear teeth elongations and the carrier teeth, and means within said tubular shaft for selective positioning of said clutch member.

3. Structure as defined by claim 2 wherein the tubular shaft includes a longitudinally elongated radial slot and a radially disposed pin therein secured at opposite ends to said last mentioned means and the clutch member.

4. Structure as defined by claim 2 wherein the last mentioned means comprises a rigid member longitudinally movable relative to said tubular shaft, the latter including a longitudinally elongated diametral slot, and a pin extending through said rigid member and at opposite ends being rigid with the clutch member.

RALPH H. MORGAN.

REFERENCES CITED

The following references are of record in the file of this patent:

UNITED STATES PATENTS

| Number | Name | Date |
|---|---|---|
| 1,156,848 | Miller | Oct. 12, 1915 |
| 1,773,699 | Wasbauer | Aug. 19, 1930 |
| 1,777,997 | Wise | Oct. 7, 1930 |
| 2,137,778 | McCullough | Nov. 22, 1938 |

FOREIGN PATENTS

| Number | Country | Date |
|---|---|---|
| 8,432 | Great Britain | Apr. 10, 1913 |